United States Patent
Herskovic et al.

(10) Patent No.: US 9,639,689 B1
(45) Date of Patent: May 2, 2017

(54) USER AUTHENTICATION

(71) Applicant: EMC Corporation, Hopkinton, MA (US)

(72) Inventors: Maya Herskovic, Tel Aviv (IL); Ika Bar-Menachem, Herzelia (IL); Theodor Mihalache, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/138,451

(22) Filed: Dec. 23, 2013

(51) Int. Cl.
  *G06F 21/62* (2013.01)
  *G06F 21/44* (2013.01)
(52) U.S. Cl.
  CPC ................................ *G06F 21/44* (2013.01)
(58) Field of Classification Search
  CPC ....... H04L 63/08; H04L 63/102; H04L 63/10; G06F 21/6218; G06F 7/04; G06F 15/16; G06F 17/30; H04W 12/06
  USPC ............................................................ 726/4
  See application file for complete search history.

(56) References Cited

U.S. PATENT DOCUMENTS

| | | | | |
|---|---|---|---|---|
| 8,601,588 | B1* | 12/2013 | Black et al. | 726/25 |
| 8,902,045 | B1* | 12/2014 | Linn | G06F 21/32 340/5.53 |
| 2010/0030586 | A1* | 2/2010 | Taylor et al. | 705/4 |
| 2012/0060207 | A1* | 3/2012 | Mardikar et al. | 726/4 |
| 2013/0061302 | A1* | 3/2013 | Colla et al. | 726/6 |
| 2013/0227678 | A1* | 8/2013 | Kang et al. | 726/19 |
| 2014/0279554 | A1* | 9/2014 | Priebatsch | G06Q 20/322 705/67 |

FOREIGN PATENT DOCUMENTS

| | | | | |
|---|---|---|---|---|
| GB | 2411554 B | * | 1/2006 | |
| WO | WO2006118968 A2 | * | 11/2006 | G06F 21/00 |

* cited by examiner

*Primary Examiner* — Amir Mehrmanesh
*Assistant Examiner* — Sakinah Taylor
(74) *Attorney, Agent, or Firm* — Krishnendu Gupta; Jason A. Reyes

(57) ABSTRACT

There is disclosed a technique for use in authentication. The technique comprises selecting an authentication challenge when an authentication request is deemed risky. An attack threat determined to be associated with the authentication request acts as a decision factor in the selection of the authentication challenge such that a biometric challenge is selected in the event that the attack threat describes a stolen device and an out-of-band challenge is selected in the event that the attack threat describes a stolen identification credential.

12 Claims, 5 Drawing Sheets

USER AUTHENTICATION

TECHNICAL FIELD

The present invention relates generally to user authentication, and more particularly to providing authentication challenges.

BACKGROUND OF THE INVENTION

In today's high-tech, fast-paced, hyper-connected world, people are spending more and more time on the internet to complete more of their daily activities such as online banking and shopping. The convenience afforded by the access and availability of the online world, however, is not without drawbacks. This increased access has brought with it an unparalleled growth in online fraudulent activity.

Reports about identity takeover, filled with phrases like Trojan, Man in the Middle, Man in the Browser, and Phishing, are increasingly in the news. These emerging threats have triggered a growing awareness by service providers and customers alike. These threats are serious and need to be addressed.

Service providers, such as financial institutions, trying to encourage customer activity, while at the same time minimizing losses from financial fraud, are looking for ways to deal with these threats. One possible way is to use a risk-based authentication system with an associated risk engine to assign risk scores to transactions. The transactions with a low risk score can be processed. Those transactions with a high risk score can be rejected or else a further step up challenge can be issued. For example, the risk-based authentication system can be configured to issue an authentication challenge to the user. There can be numerous different types of challenges such as an SMS challenge and a biometric challenge. The risk-based authentication system can send the challenge to the user. The decision of whether to authenticate may be dependent on the response to the challenge.

The problem with the above approach is how to provide the appropriate authentication challenge to issue to the user.

The present invention is directed towards providing the appropriate authentication challenge.

SUMMARY OF THE INVENTION

There is disclosed a computer-implemented method, comprising: determining a risk type in connection with an authentication request; based on the risk type, selecting an authentication challenge; and providing the authentication challenge.

There is also disclosed an apparatus, comprising: one or more processors; and a computer-readable medium storing instructions for execution by the one or more processors, the instructions comprising instructions to: determining a risk type in connection with an authentication request; based on the risk type, selecting an authentication challenge; and providing the authentication challenge.

There is further disclosed a computer program product having a non-transitory computer-readable medium storing instructions, the instructions, when carried out by one or more processors, causing the one or more processors to perform a method of: determining a risk type in connection with an authentication request; based on the risk type, selecting an authentication challenge; and providing the authentication challenge.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

The technique as described herein can be used in user authentication. In at least one embodiment, the technique can be used to authenticate a user in a mobile authentication environment. The technique can use analytics to assess the potential attack type (e.g., device theft, device impersonation, etc.) after assessing mobile user's operation as risky or potentially fraudulent. The technique can use this new information as an additional decision factor when choosing the appropriate authentication challenge to send to the user. For example, if risk is high due to device theft indicators, the technique can select authentication challenges that are suited for device theft detection, such as biometric authentication, or at least recommend avoiding authentication challenges that are weak for this specific risk like SMS based authentications.

Figure 1:
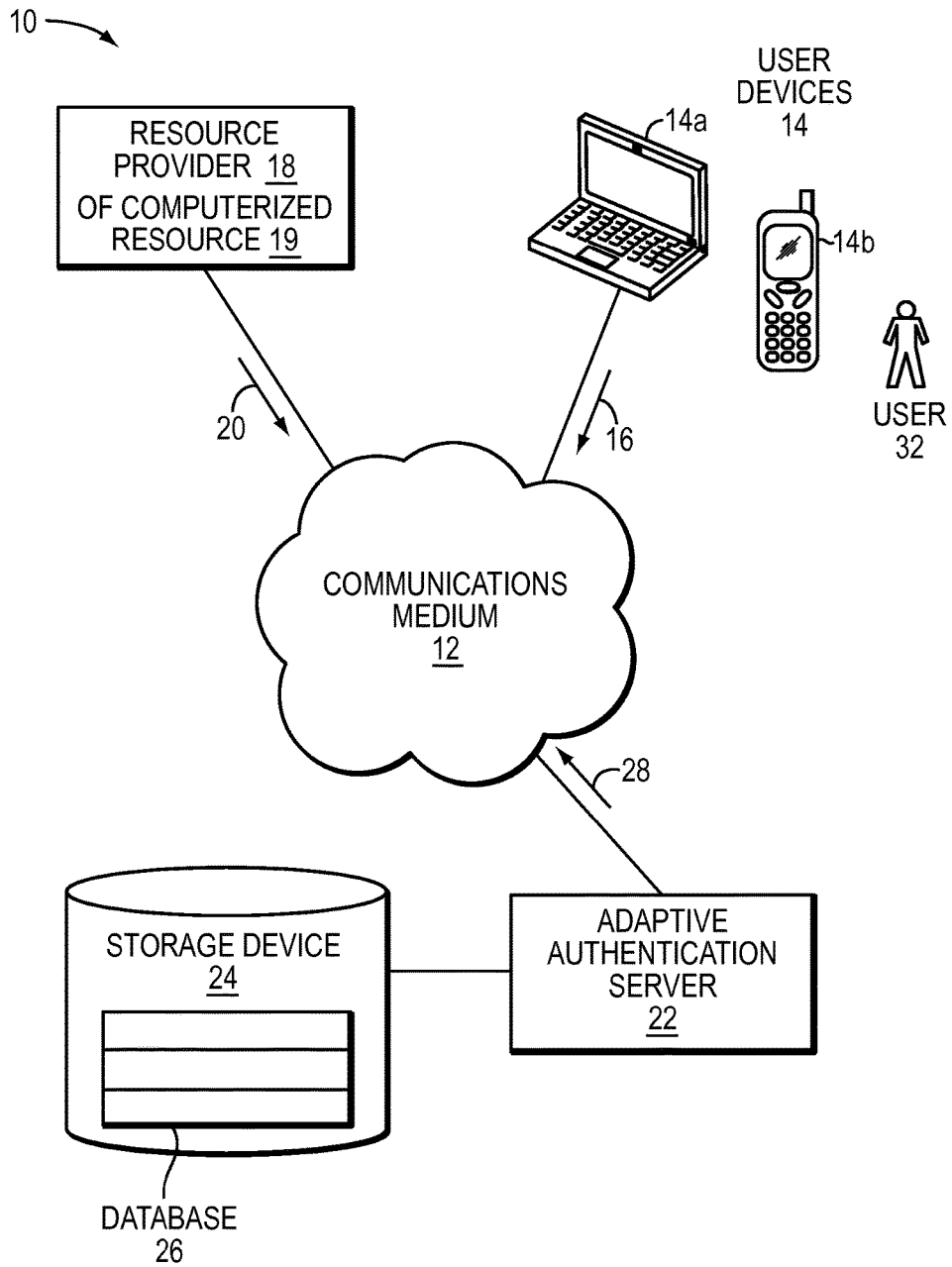
FIG. 1 is a schematic diagram illustrating an electronic environment for carrying out a technique.

Referring to FIG. 1, there is illustrated an electronic environment 10 for carrying out a technique. Electronic environment 10 includes communications medium 12, user devices 14, resource provider 18, and adaptive authentication server 22.

Communication medium 12 provides network connections between user devices 14, resource provider 18, and adaptive authentication server 22. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

User devices 14 include smartphones, personal digital assistants, laptop computers, desktop computers, tablet computers, and the like constructed and arranged to submit transaction request 16 to resource provider 18 via communications medium 12.

Resource provider 18 is constructed and arranged to receive transaction 16 from user device 14 via communications medium 12. Resource provider 18 is constructed and arranged to send transaction 20 to adaptive authentication server 22 via communications medium 12. Resource provider 18 is further constructed and arranged to receive adaptive authentication result 28 from adaptive authentication server 22.

Adaptive authentication server 22 is constructed and arranged to receive transaction 20 from resource provider 18 over communications medium 12. Adaptive authentication server 22 is also constructed and arranged to access transaction data in database 26 stored on storage device 24. Adaptive authentication server 22 is further constructed and arranged to send adaptive authentication results 28 to resource provider 18.

During operation, a user 32 initially attempts to login with the resource provider 18 in order to obtain access to a computerized resource 19. In particular, the user 32 provides an authentication request or login request 16 using a particular user device 14. The login request 16 may include a variety of identification information entered by the user 32, as well as ancillary information (e.g., a device identifier from the user device 14, an ISP network address, a geographic location, etc.). The resource provider 18 then sends a request transmission 20 through the communications medium 12 to the adaptive authentication server 22 directing the adaptive authentication server 22 to perform an adaptive authentication operation.

Next, the adaptive authentication server 22 performs the adaptive authentication operation in response to the request transmission 20. In at least one embodiment, the adaptive authentication server 22 performs the adaptive authentication operation by obtaining information concerning the previous transactions from database 26 stored on storage device 24. Database 26 contains a set of entries, each entry being associated with a transaction. Each entry includes values of attributes of the associated transaction. In generating authentication result 28, adaptive authentication server 22 accesses database 26 and locates relevant entries of previous transactions with the assistance of the identification information and/or ancillary information. Adaptive authentication server 22 then reads the values from the previous transactions to enable an analysis between the previous transactions and the current transaction 16 such that the authentication result 28 can be generated.

After generating authentication result 28, adaptive authentication server 22 sends authentication result 28 to resource provider 18 over communications medium 12. Based on authentication result 28, resource provider 18 can process transaction 16 or cancel transaction 16.

It should be understood that in this embodiment the resource provider 18 can provide each user device 14 with access to one or more computerized resources 19 following successful user authentication through that user device 14. An example of a suitable resource provider 18 is a data storage array which provides secure access to files, directories, volumes, logical unit numbers (LUNs), etc. Another example of a suitable resource provider 18 is a web server which provides secure access to various web pages. Yet another example of a suitable resource provider 18 is a server which provides secure user account and/or transactional access such as that for an online banking site, an online store, an online gaming site, and so on. Other types of resource providers are suitable for use as well.

Figure 2:
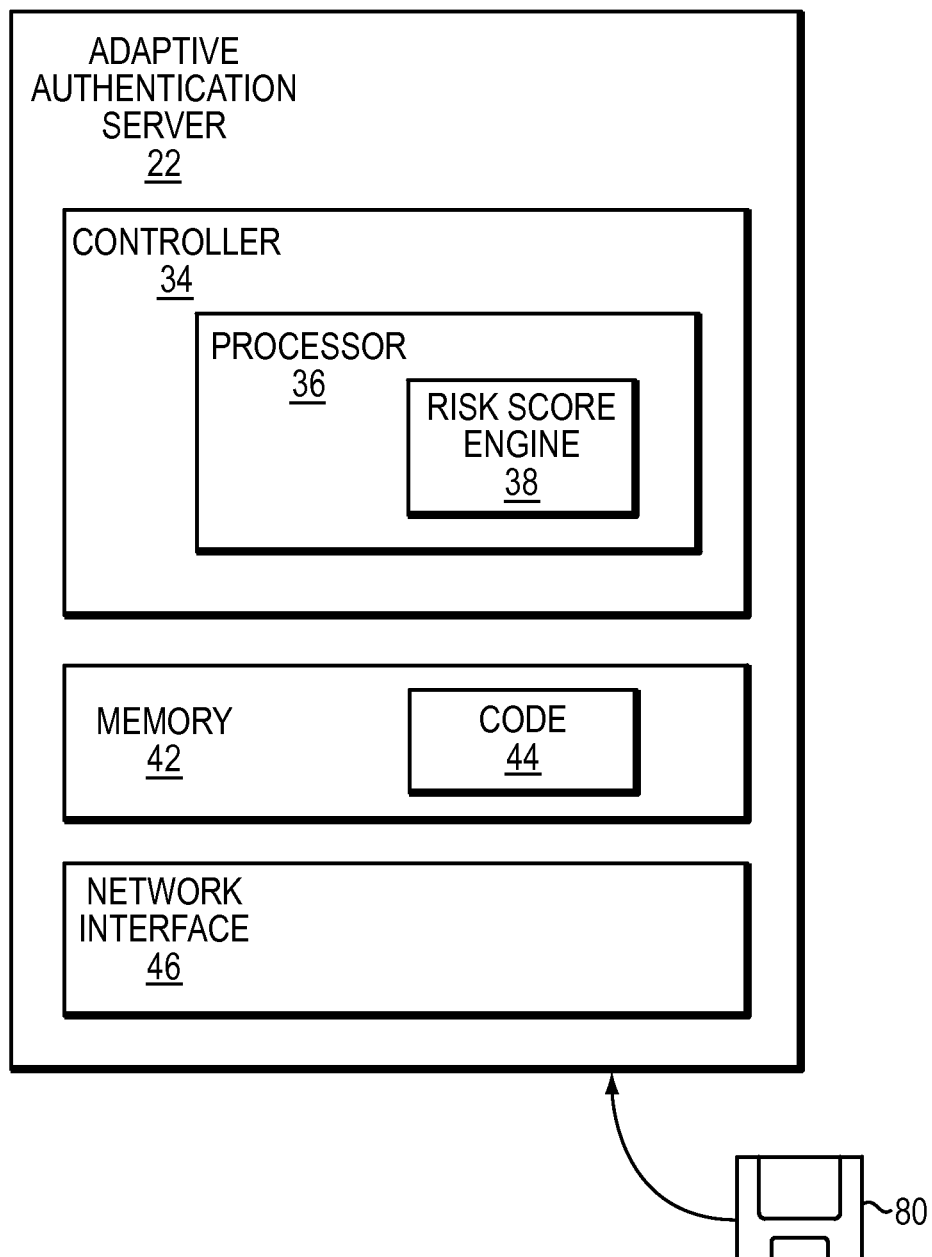
FIG. 2 is a schematic diagram illustrating an adaptive authentication device within the electronic environment shown in FIG. 1.

Further details concerning adaptive authentication server 22 are considered with respect to FIG. 2.

Referring to FIG. 2, there is illustrated some components of adaptive authentication server 22. Adaptive authentication server 22 includes a controller 34, which in turn includes processor 36, a memory 42 and a network interface 46.

Memory 42 is configured to store code which includes code 44 constructed and arranged to process an authentications request. Memory 42 is further configured to store transaction 20 received from resource provider 18. Memory 42 generally takes the form of, e.g., random access memory, flash memory or a non-volatile memory.

Processor 36 takes the form of, but is not limited to, Intel or AMD-based MPUs, and can include a single or multi-cores each running single or multiple threads. Processor 36 is coupled to memory 42 and is configured to execute instructions from code 44 stored in memory 42. Processor 36 includes risk score engine 38.

Risk score engine 38 is constructed and arranged to assign a risk score to a transaction based on values of attributes of previous transactions and transaction 20 stored in memory 42.

Network interface 46 is constructed and arranged to send and receive data over communications medium 12. Specifically, network interface 46 is configured to receive transaction 20 from resource provider 18 over communications medium 12 and to send transaction result 28 to resource provider 18 over communications medium 12. Also, network interface 46 is constructed and arranged to receive data from storage device 24.

During operation, the processor 36 may generate a user attribute risk score (i.e., a result between 0 and 1000) indicating an amount of risk based on a comparison between earlier stored attributes and currently received attributes. In this situation, the processor 36 may compare the risk score to a predefined user attribute threshold so that a user attribute risk score above the user attribute threshold indicates a likely fraudster situation while a user attribute risk score below the user attribute threshold indicates an unlikely fraudster situation. In some arrangements, the user attribute risk score is an aggregation of individual weight risk analysis results from comparisons of individual attribute factors.

Similarly, the processor 36 may generate a user behavior risk score (i.e., a result between 0 and 1000, but which is a different score than the user attribute risk score) indicating an amount of risk based on a comparison between earlier stored user behavior information and recently received user behavior information. In this situation, the processor 36 may compare the risk score to a predefined user behavior threshold so that a user behavior risk score above the user behavior threshold indicates a likely fraudster situation while a user behavior risk score below the user behavior threshold indicates an unlikely fraudster situation. In some arrangements, the user behavior risk score is an aggregation of individual weight risk analysis results from comparisons of individual behavior factors.

In some arrangements, adaptive authentication server 22 is implemented by a set of processors or other types of control/processing circuitry running software. In such arrangements, the software instructions can be delivered to adaptive authentication server 22 in the form of a computer program product 80 having a computer readable storage medium which stores the instructions in a non-volatile manner. Alternative examples of suitable computer readable storage media include tangible articles of manufacture and apparatus such as CD-ROM, flash memory, disk memory, tape memory, and the like.

Figure 3:
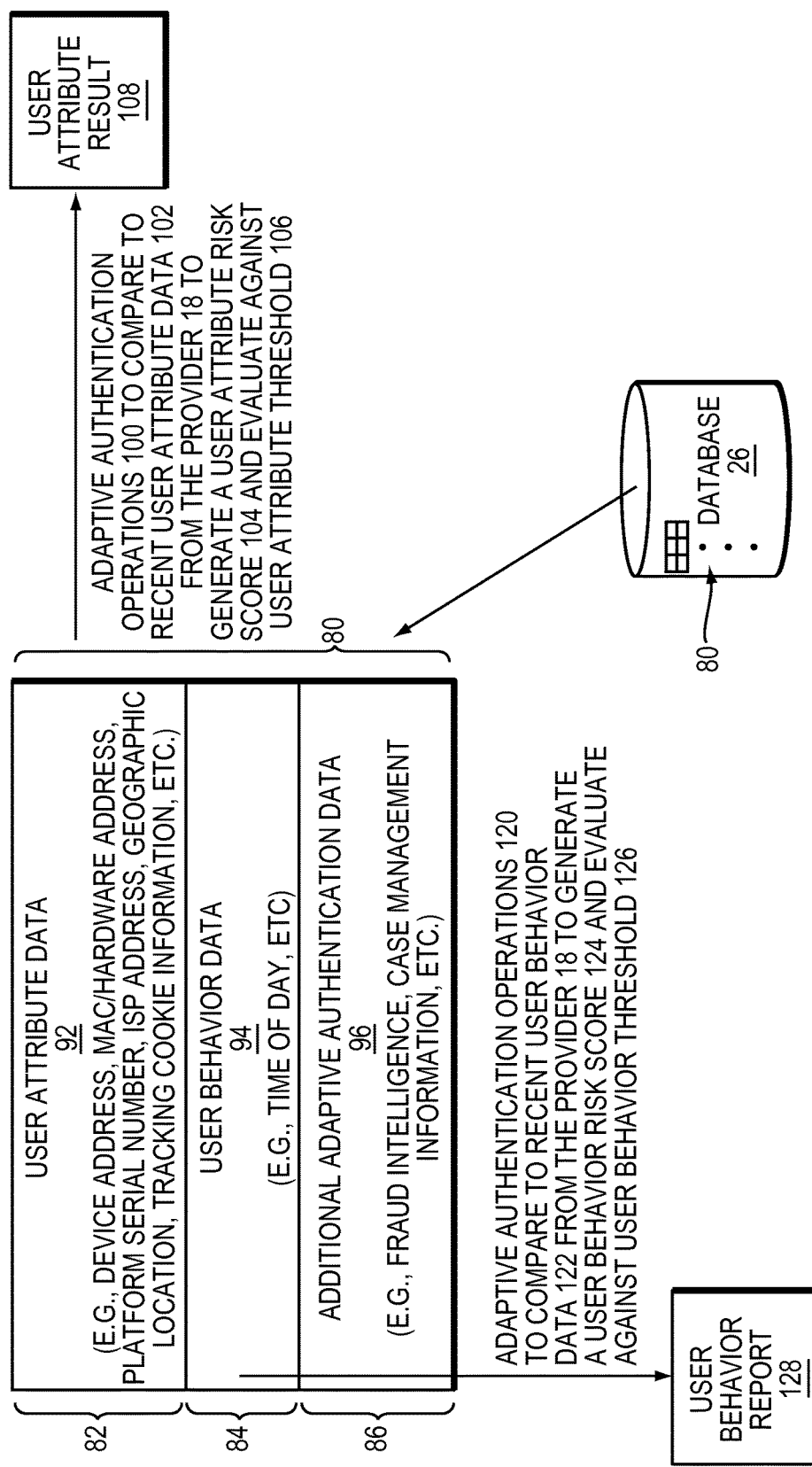
FIG. 3 is a block diagram showing particular aspects of a user database and how user information stored in the user database is utilized by the adaptive authentication server of FIG. 2.

Referring to FIG. 3, there is illustrated some aspects of the database 26 and how the information stored in the user database 26 is utilized by the adaptive authentication server 22 of FIG. 2. As shown, the database 26 includes user entries 80 which define various features of the users 32 (also see FIG. 1). It should be understood that the database 26 stores values based on previous transactions. As more authentication requests are received, the database 26 accumulates more data and thus better defines certain user attributes and behaviors of the users 32.

Each user entry 80 includes, for a particular user 32, a set of user attribute fields 82, a set of behavior data fields 84, and additional adaptive authentication fields 86. The user attribute fields 82 are constructed and arranged to contain user attribute data 92 of that user 32 (e.g., device address, ISP address, geographic location, tracking cookie information, etc.). The user behavior fields 84 are constructed and arranged to contain user behavior data 94 of that user 32 (e.g., time of day authentication request received, etc.). The additional adaptive authentication fields 86 are constructed and arranged to contain additional information such as data that is appropriate for fraud intelligence (e.g., a note indicating the user has user attributes/behavior which is highly correlated to hacking), case management (e.g., history of previous hacking), and so on.

As shown, the adaptive authentication server 22 performs operations 100 to determine whether to approve or deny user access in response to a current user login attempt. Here, the processor 36 (FIG. 2) of the adaptive authentication server 22 compares the user attribute data 92 to recent user attribute data 102 from the provider 18 to generate a user attribute risk score 104 which is evaluated against a predefined user attribute threshold 106 (e.g., a tunable number between 0 and 1000). If the user attribute risk score 104 is lower than the user attribute threshold 106, the processor 36 gives a user attribute result 108 a first access value to grant the user 32 access to the resource provider 18. However, if the user attribute risk score 104 is higher than the user attribute threshold 106, the processor 36 gives the user attribute result 108 a second access value to deny the user 32 current access to the resource provider 18.

Similarly, the adaptive authentication server 22 performs routine operations 120 to determine whether to flag possible fraudster situations to the resource provider 18 so that the resource provider 18 can take remedial steps (e.g., follow-up with the user 32). In this situation, the processor 36 of the adaptive authentication server 22 compares the user behavior data 94 to recent user behavior data 122 from the resource provider 18 to generate a user behavior risk score 124 which is evaluated against a predefined user behavior threshold 126 (e.g., a tunable number between 0 and 1000). If the user behavior risk score 124 is lower than the user behavior threshold 126, the processor 36 gives a user behavior report 128 a first behavior value indicating that a possible fraudster situation is unlikely. However, if the user behavior risk score 124 is higher than the user behavior threshold 126, the controller 34 gives the user behavior report 128 a second behavior value indicating that a possible fraudster situation is likely and should be further investigated.

Likewise, it should be understood that additional evaluations are made to the data that is received from the resource provider 18. Along these lines, intermediate risk results may be weighted and combined with other intermediate risk results to determine an overall risk score on a sliding continuous scale (e.g., between 0 and 1000). The particular position along the sliding continuous scale provides an indication of the risk associated with a particular user 32, i.e., the likelihood that a fraudster has compromised the user's account with the resource provider 18.

Figure 4:
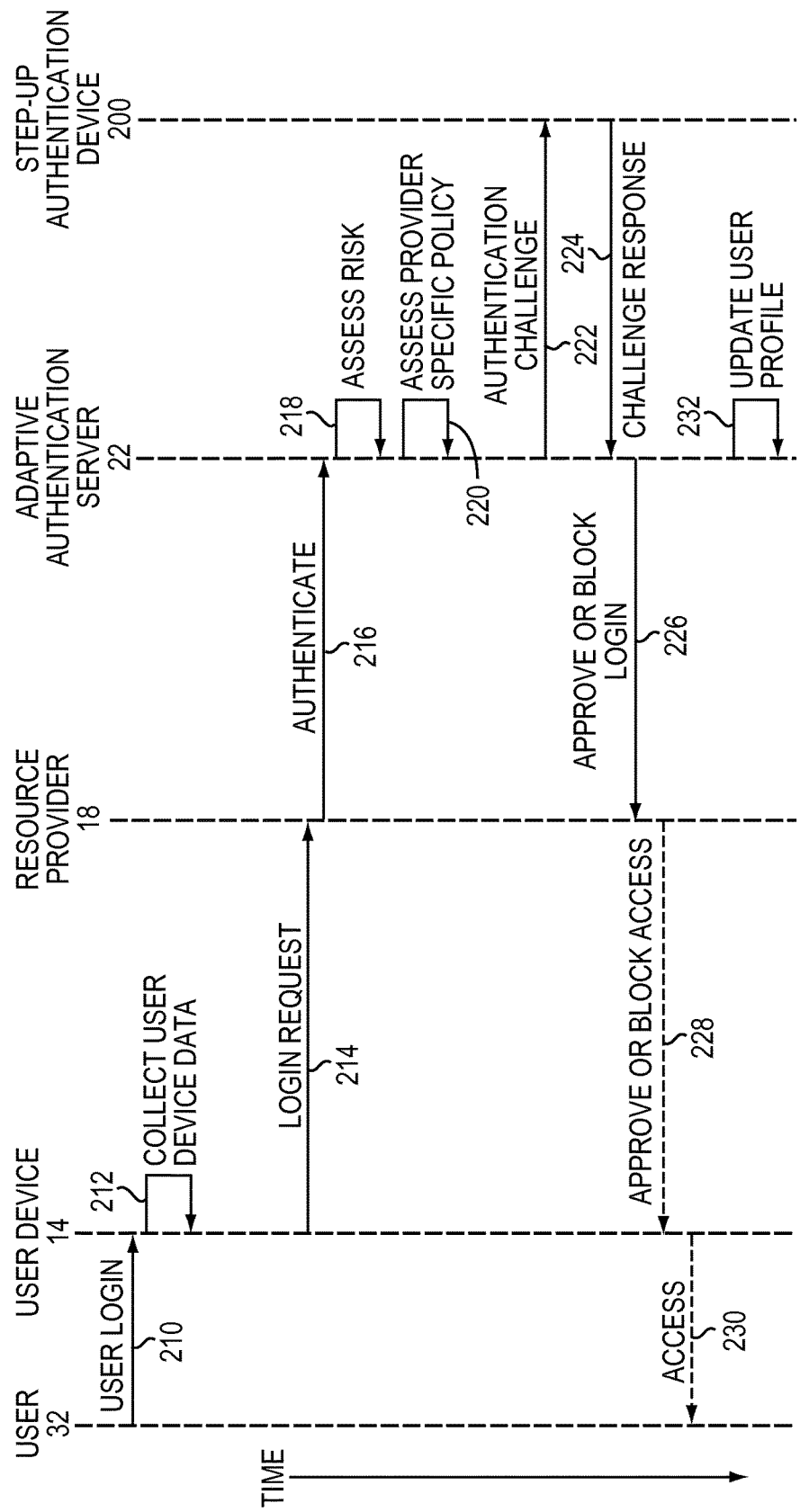
FIG. 4 is a sequence diagram illustrating various communications between components of the environment of FIG. 1 during a user login attempt.

Referring to FIG. 4, there is illustrated a sequence diagram illustrating communications between certain components of the environment 10 during a user login attempt. It should be understood that the environment 10 also includes a device 200. The device 200 can be an out-of-band device. It can also in certain instances be the user device 14. Time increases in the downward direction.

Initially, the user 32 operates the user device 14 to send a login request to the resource provider 18 (arrows 210, 212 and 214). The user device 14 includes user device data (e.g., a device identifier, a certificate, a MAC address, location, other formal credentials, etc.) which uniquely identifies the user device 14 (arrow 212). The resource provider 18 then provides an authentication request to the adaptive authentication server 22 perhaps with additional information such as an IP address, ISP information, and information regarding the user's application (e.g., a browser, etc.) (arrow 216), which assesses the risk (arrow 218) and perhaps performs additional operations which are predefined by the resource provider 18 (arrow 220).

In one particular embodiment, the adaptive authentication server 26 is configured to perform additional authentication operations in the event that the risk associated with the login request exceeds a defined threshold. For example, the adaptive authentication server 26 can issue a challenge to the user through the device 200 (arrow 222). The challenge requires that the user 32 provide a response (arrow 224) using the device 200.

Next, the adaptive authentication server 22 makes a decision whether to approve or block the user 32, and sends the result of that decision to the resource provider 18 (arrow 226). Upon receipt of the decision, the resource provider 18 either approves or blocks access to the computerized resource 19 (arrows 228 and 230 which are shown as dashed arrows since access may be blocked). Such operation may include creation of a ticket for follow-up by a fraud department.

Additionally, the adaptive authentication server 26 updates its records in the database 26 with data gathered during the user login attempt (arrow 232). Such information may include identification information of a new user device 14, a new location, and so on.

It should be understood that the exchanges are preferably performed during a user login attempt.

Figure 5:
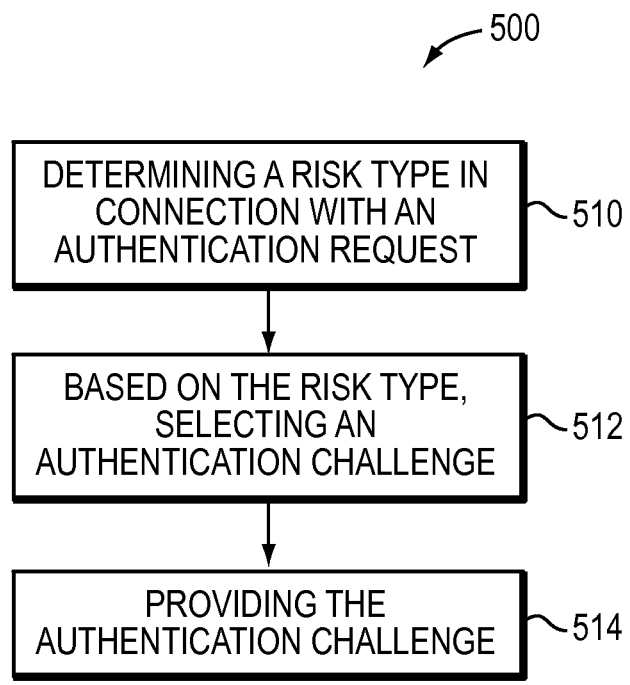
FIG. 5 is a flow chart illustrating a method of carrying out the technique within the electronic environment shown in FIG. 1.

Referring to FIG. 5, there is illustrated a flow chart illustrating a method of carrying out the technique within the electronic environment shown in FIG. 1. The exemplary method 500 can be used for providing a user authentication challenge. For example, the method can be used in step 222 in FIG. 4. In the flow diagram, the operations are summarized in individual blocks. The operations may be performed in hardware, or as processor-executable instructions that may be executed by a processor. Furthermore, the method 500 may, but need not necessarily, be implemented in the environment of FIG. 1.

At step 510, a risk type is determined in connection with an authentication request. The term 'risk type' in this disclosure refers to a type of possible attack threat associated with an authentication request. The authentication server 22 may determine the risk type by analysing at least some of the attributes associated with the authentication request. In this case, the authentication server 22 may determine the risk type in response to first determining that the riskiness of the authentication request exceeds an unacceptable level of riskiness. For example, if the risk score as determined by the risk score engine 38 exceeds a threshold then the authentication server 22 may be configured to determine a risk type in connection with the risky authentication request.

It should be understood that in at least one embodiment the risk type may relate to a stolen device fraudulently obtained by an attacker. For example, the device may be a mobile device typically used by an authentic user. Subsequently, the attacker may use such device to imitate the user by issuing an authentication request from the device. In such a scenario, if at least some of the attributes other than the device identifier associated with the stolen device indicate a risky transaction then this may indicate that the risk type relates to a stolen device.

It should be understood that in at least one embodiment the risk type may also relate to stolen credentials. For example, the attacker may have fraudulently obtained user credentials such as passcodes etc. Subsequently, the attacker may use such passcodes to imitate the user. In such a scenario, if some of the attributes other than passcodes indicate a risky transaction then this may indicate that the risk type relates to stolen credentials. For example, if the passcodes are the same as usual but the behavioural attributes associated with the request indicate risk then the risk type may relate to stolen credentials.

At step 512, an authentication challenge is selected based on the risk type. By authentication challenge, it is meant a step up challenge that is required to further authenticate a user. Authentication challenges may be used particularly in the event that the authentication request is considered risky. Such authentication challenges can include an SMS challenge, a biometric challenge, a voice authentication challenge and a facial recognition challenge.

The authentication server 22 may select the challenge based on the risk type. For example, if the risk type relates to stolen device, then the challenge may be any one of a biometric challenge, a voice authentication challenge and a facial recognition challenge. If the risk type relates to stolen credentials, then the challenge may be an SMS challenge. Because selection is based on the risk type, it is possible to overcome situations where inappropriate challenges are issued to an attacker by static rules, such as an SMS challenge being sent to a device already in the possession of the attacker. The technique described herein can overcome this scenario by issuing a biometric challenge in such a scenario.

At step 514, the selected authentication challenge is provided to the user. The authentication server 22 can provide the challenge to the device 200 or indeed to the user device 14.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method, comprising:
receiving, by processing circuitry, a request to authenticate an electronic transaction involving a specific user seeking access to a computerized resource;
in response to receiving the request, analysing, by processing circuitry, at least one attribute associated with the electronic transaction, wherein the at least one attribute describes the electronic transaction involving the specific user;
based on the analysis, determining, by processing circuitry, an attack threat in connection with the electronic transaction, wherein the attack threat describes one of a stolen device and a stolen identification credential obtained by a fraudster;
based on the attack threat, selecting, by processing circuitry, an authentication challenge that challenges the specific user, wherein the attack threat acts as a decision factor in the selection of the authentication challenge such that a biometric challenge is selected in the event that the attack threat describes a stolen device and an out-of-band challenge is selected in the event that the attack threat describes a stolen identification credential;
providing, by processing circuitry, the authentication challenge in a manner that requires the specific user to respond;
receiving, by processing circuitry, a user response to the authentication challenge;
generating, by processing circuitry, an authentication result based on the user response, the authentication result indicating whether the electronic transaction is authentic; and
utilizing, by processing circuitry, the authentication result to control access by the specific user to the computerized resource.

2. The method as claimed in claim 1, further comprising:
determining a riskiness in connection with the electronic transaction.

3. The method as claimed in claim 2, wherein determining the riskiness comprises determining a risk score in connection with the electronic transaction.

4. The method as claimed in claim 2, wherein determining the attack threat comprises determining the attack threat in connection with the electronic transaction in response to determining that the riskiness exceeds an unacceptable level of riskiness.

5. An apparatus, comprising:
processing circuitry; and
memory storing instructions for execution by the processing circuitry, the instructions comprising instructions to:
receive a request to authenticate an electronic transaction involving a specific user seeking access to a computerized resource;
in response to receiving the request, analyse at least one attribute associated with the electronic transaction, wherein the at least one attribute describes the electronic transaction involving the specific user;
based on the analysis, determine an attack threat in connection with the electronic transaction, wherein the attack threat describes one of a stolen device and a stolen identification credential obtained by a fraudster;
based on the attack threat, select an authentication challenge that challenges the specific user, wherein the attack threat acts as a decision factor in the selection of the authentication challenge such that a biometric challenge is selected in the event that the attack threat describes a stolen device and an out-of-band challenge is selected in the event that the attack threat describes a stolen identification credential;

provide the authentication challenge in a manner that requires the specific user to respond;

receive a user response to the authentication challenge;

generate an authentication result based on the user response, the authentication result indicating whether the electronic transaction is authentic; and utilize the authentication result to control access by the specific user to the computerized resource.

6. The apparatus as claimed in claim 5, further comprising instructions to:

determine a riskiness in connection with the electronic transaction.

7. The apparatus as claimed in claim 6, wherein determining the riskiness comprises determining a risk score in connection with the electronic transaction.

8. The apparatus as claimed in claim 6, wherein determining the attack threat comprises determining the attack threat in connection with the electronic transaction in response to determining that the riskiness exceeds an unacceptable level of riskiness.

9. A computer program product having a non-transitory computer readable medium storing instructions, the instructions, when carried out by one or more processors, causing the one or more processors to perform a method of:

receiving a request to authenticate an electronic transaction involving a specific user seeking access to a computerized resource;

in response to receiving the request, analysing at least one attribute associated with the electronic transaction, wherein the at least one attribute describes the electronic transaction involving the specific user;

based on the analysis, determining an attack threat in connection with the electronic transaction, wherein the attack threat describes one of a stolen device and a stolen identification credential obtained by a fraudster;

based on the attack threat, selecting an authentication challenge that challenges the specific user, wherein the attack threat acts as a decision factor in the selection of the authentication challenge such that a biometric challenge is selected in the event that the attack threat describes a stolen device and an out-of-band challenge is selected in the event that the attack threat describes a stolen identification credential;

providing the authentication challenge in a manner that requires the specific user to respond;

receiving a user response to the authentication challenge;

generating an authentication result based on the user response, the authentication result indicating whether the electronic transaction is authentic; and utilizing the authentication result to control access by the specific user to the computerized resource.

10. The computer program product as claimed in claim 9, further causing the one or more processors to perform a method of:

determining a riskiness in connection with the electronic transaction.

11. The computer program product as claimed in claim 10, wherein determining the riskiness comprises determining a risk score in connection with the electronic transaction.

12. The computer program product as claimed in claim 10, wherein determining the attack threat comprises determining the attack threat in connection with the electronic transaction in response to determining that the riskiness exceeds an unacceptable level of riskiness.

* * * * *